Feb. 25, 1930. G. F. BENHOFF 1,748,201
PROCESS FOR THE CONVERSION OF HYDROCARBON OILS
Filed April 1, 1924 3 Sheets-Sheet 1

INVENTOR.
George F. Benhoff
BY Lawrence S. Paddock
ATTORNEY.

Feb. 25, 1930. G. F. BENHOFF 1,748,201
PROCESS FOR THE CONVERSION OF HYDROCARBON OILS
Filed April 1, 1924 3 Sheets-Sheet 3

FIG. 5.

INVENTOR
George F. Benhoff
BY Lawrence S. Paddock
ATTORNEY

Patented Feb. 25, 1930

1,748,201

UNITED STATES PATENT OFFICE

GEORGE F. BENHOFF, OF PHILADELPHIA, PENNSYLVANIA

PROCESS FOR THE CONVERSION OF HYDROCARBON OILS

Application filed April 1, 1924. Serial No. 703,399.

This invention relates to processes for the refining of hydrocarbon oils. It has particular relation to a process in which heavier hydrocarbon oils are subjected to treatment such as will produce the desired refined products in a continuous operation. To this end I have provided a process wherein crude or heavy hydrocarbon oils are subjected to distillation with the removal of such products as are desired, while those portions which are particularly suited to cracking, are subjected to a cracking reaction without removal from the continuous cycle of operation.

It is also an object of my invention to blend any selected condensate or combination of condensates of the vaporous products of distillation with any selected condensate or combination of condensates of the vaporous products of the cracking reaction while in the liquid phase during the continuous operation, or to return any selected condensate or combination of condensates of the vaporous products of distillation or cracking, to retreatment in the zone of the cracking reaction with the subsequent treatment to which the products of the cracking reaction are subjected.

It is also an object of my invention to selectively intermix the condensates of the products of distillation with the condensates of the vaporous products of the cracking reaction in such a manner that selected condensates of the vaporous products of distillation will be revaporized and blended with the vaporous products of the cracking reaction.

By the described method of liquid and vapor phase blending of the various condensates with the subsequent treatment to which they are subjected, it is possible to produce final products of the desired quality to meet commercial specifications without further treatment.

Another object of my invention is to blend the "reduced crude" or residue oil from the action of distillation with the condensates which have been selected from the condensates of the vaporous products of distillation and cracking for retreatment, and return the mixture of residue oil and condensates thus formed to treatment in the zone of the cracking reaction. By this procedure a greater yield of the desirable end products is obtained in the cracking reaction and the residue of the cracking reaction is cleaner and of a more desirable quality for subsequent treatment.

A further object of my invention is to remove the free carbon formed in the endothermic reaction from the oil being converted, and hold the same in liquid suspension while it is being withdrawn and circulated in the system for the purposes hereinafter set forth.

A further object is to use the carbon held in liquid suspension for fuel to provide the heat necessary to the endothermic reactions of my process.

A further object of my invention is to utilize the heat of the gases of combustion in such a manner as to transfer the maximum amount of heat from the same to the oils being treated throughout the system.

A further object of my invention is to hold the oils being treated in a closed circuit until the production of the finished products, thus avoiding distillation losses and greatly reducing the operating cost.

Other objects will hereinafter appear from the following detailed description.

In order to render my present invention clear, reference is had to the accompanying drawings in which.

In the embodiment of my invention herein shown in the drawings, the pump 1 draws crude oil from the tanks 4 through the conduit 2 provided with valve controlled branch conduits 3. From the pump 1 the discharged oil is delivered through the conduit 5 to the heat exchanger 6. From the exchanger 6 the oil is delivered through the conduit 7 to the vertical heat exchanger 8 at the point 9. The conduit 7 is provided with a control valve 10, the oil is delivered from the exchanger 8 through the conduit 11. The oil may be by-passed around the exchanger 8 by a conduit 12, as shown. The conduit 11 leads to the lower inlet end of the heating coil 13 of a topping pipe still 14, wherein the oil is heated to the desired temperature to cause the evaporation of those constituents which it is desired to separate from the crude oil. The heated oil leaves the coil 13 of the topping still 14 by a conduit 15. The conduit 15 delivers the heated oil into the evaporator 16. Within the evaporator the hot oil falls on the top plate of a series of plates 17 so positioned that the oil is spread over the surface of each plate in succession as it descends in a cascade to the bottom of the evaporator. This permits those portions of the heated crude oil which are vaporizable at the temperature to which it has been heated, to flash into vapor, while the unvaporized portions collect in the bottom of the evaporator as liquid residue or what is commonly known as "reduced crude." This liquid residue or "reduced crude" passes through the conduit 18 to the accumulator 19. A conduit 20 leads from the top of the accumulator 19 to the top of the evaporator 16 and serves to pass any vapors which may collect in the accumulator 19 into the evaporator 16. A conduit 21 leads from the top of the evaporator 16 to a series of dephlegmators or fractionating towers 22, 23, 24, 25, 26 and 27, entering the base of the tower 22. From the base of the accumulator 19 a conduit 28 leads to the exchanger 6. The oil from the conduit 28 passes through the exchanger 6 counter current to the oil delivered from the pump 1 through the conduit 5, and passes out through conduit 29. The conduit 29 delivers the oil passing therethrough to a pump 30. The pump 30 delivers the oil, under the desired pressure, through a conduit 31 to a preheating coil 32, in a preheater 33. The oil leaves the preheater 33 by way of a conduit 34. The conduit 34 delivers the preheated oil into the lower inlet end of a cracking coil 35 in a cracking still 36. After being raised to the desired cracking temperature, the oil leaves the cracking coil by way of conduit 37. The conduit 37 delivers into the upper end of an evaporator 38. Within the evaporator 38, the oil, which has been heated to a cracking temperature, enters a zone of lower pressure, thereby causing those portions which will vaporize at the temperature they are under and at the pressure maintained in the evaporator, to flash into vapor. The cracking reaction within the coil 35 may be conducted in either the well-known liquid-vapor or liquid phase in such a manner tl it sufficient liquid remains in the cracking reaction to carry the carbon suspended therein which has been formed during the cracking reaction into the evaporator 38 as hereinafter described.

Within the evaporator is located a series of curved plates 39. The plates 39 are provided with a toe rail 40 and follow the interior contour of the evaporator in a downwardly curved path. The lower end of each plate overlaps the upper end of the next plate beneath it, and the ends are so positioned as to leave a vertical space between them. The unvaporized oil falls on the upper plate and is caused to spread out over the same and take a downward course, falling in a cascade from one plate to the next, to the bottom of the evaporator. Due to the sudden expansion within the evaporator, carbon which is formed by the subjection of the oil to a higher temperature in the cracking coil, is released from the vaporized oil and is carried with the residual oil to the base of the evaporator.

The downwardly curved inclination of the pans 39 is calculated to rapidly augment the flow of the residual oil and suspended free carbon, and deliver the same with a circular motion into the base of the evaporator. The evaporator 38 is provided with a valved safety blowoff 41. The vapors from the evaporator 38 pass through a conduit 42 to the lower end of the first of a series of dephlegmators 43, 44, 45, 46, and 47. Valves 48 and 49 in conduits 42 and 37 provide means whereby the pressure in the evaporator 38 can be controlled. By controlling the pressure in the evaporator 38 and consequently the boiling points of the heated oil delivered to the evaporator 38, those constituents which it is desired to vaporize may be allowed to vaporize and those constituents which it is desired to keep in liquid form may be kept in the liquid form.

The fractionating towers 22, 23, 24, 25, 26, 27 and 43, 44, 45, 46, 47 are made in two sections. The upper sections 50 have tube heads and tubes. The lower sections 51 have a number of baffle plates positioned in a progressive staggered relation, as shown. The shells of the fractionating towers, with the heads of sections 50 act as jackets around the tubes. Temperature regulation is accomplished by a cooling medium, such as water, supplied to the jackets. Vapors are conducted from one tower to the next by conduits 52. The condensates formed in the tubes fall on the baffles 51 cascading downward from one baffle to the next, counter current to the vapors passing through the towers. The residue vapors leaving the last fractionating tower 27, pass by way of a conduit 53 to a condenser coil 54 in a condenser box 55. From the condenser coil 54, the condensate or gasoline passes by way of a conduit 56 and look-box 57 in tailhouse 58, to receiving tank 59.

The condensates, after having traversed the baffles 51 in the towers 22 to 27 inclusive, pass from their bottoms through U seals 60 to a series of headers 61, 62, 63, 64, 65 and 66. The U seals are provided with water legs 67 for draining off water or other foreign matter which might settle in the towers. The headers 61 to 66 inclusive, connect with a series of distributing conduits 68 through valve controlled conduits 69.

Header 61 conducts the condensates from tower 27, which may be naphtha, to the cooling coil 70 in box 55. The condensates or naphtha, on leaving the cooling coil 70, passes by way of conduit 71 through lookbox 72 to the receiving tank 73. Header 62 conducts the condensates or blending naphtha from the tower 26 to cooling coil 74, from which it passes by conduit 75 through lookbox 76 to receiving tank 77. Header 63 conducts the condensates or kerosene from tower 25 to cooling coil 78, from which it passes by conduit 79 through lookbox 80 to receiving tank 81. Header 64 conducts the condensates or domestic fuel oil or gas oil from the tower 24 to cooling coil 82, from which it passes by conduit 83 through lookbox 84 to receiving tank 85. Headers 65 and 66 conduct the condensates or paraffin distillate from towers 23 and 22 to a common conduit 86, which leads to the cooling coil 87 from which the distillate is conducted by a conduit 88 through lookbox 89, to a receiving tank 90. A conduit 91 connects one of the manifolds 68, as shown, with the accumulator 19, through which the condensates flowing through headers 61 to 66 may be simultaneously or selectively passed to the accumulator 19 by opening the proper conduit or conduits. A conduit 92 connects one of the manifolds 68 with the tower 43, as shown, by which the condensates flowing through the headers 61 to 66 may be simultaneously or selectively passed to the tower 43.

A conduit 93 connects one of the manifolds 68 with tower 44, as shown, by which the condensates flowing through the headers 61 to 66 may be simultaneously or selectively passed to the tower 44. In like manner conduits 94, 95 and 96 connect with various ones of the manifolds 68, by which the condensates flowing through headers 61 to 66 may be simultaneously or selectively passed to the towers 45, 46 and 47 respectively. Each of the towers 43, 44, 45, 46 and 47 has a bottom outlet which is connected with a U bend 97. Each U bend is provided with a valve controlled drain 98. A valve controlled conduit 99 connects U bend of tower 47 to conduit 95 and valve controlled conduit 100 connects the U bend of tower 46 with conduit 94.

A valve controlled conduit 101 connects U bend of tower 45 with conduit 93. A valve controlled conduit 102 connects U bend of tower 44 with conduit 92. A valve controlled conduit 103 connects the conduit 102 with cooling coil 104. The cooling coil 104 is connected by a conduit 105 through lookbox 106, with receiving tank 107. Conduit 102 is also connected by a valve controlled conduit 108 with conduit 91. A valve controlled conduit 109 connects the U bend of tower 43 with conduits 108 and 91, and a valve controlled conduit 110 connects the conduit 109 with conduit 103. Conduit 101 is connected by a valve controlled conduit 111 with conduit 64 and by a valve controlled conduit 112 with conduit 108. Conduit 100 is connected by a valve controlled conduit 113 with conduit 62 and by a valve controlled conduit 114 with conduit 112. Conduit 99 is connected by a valve controlled conduit 115 with conduit 61, and by a valve controlled conduit 116 with conduit 114. The vapors leaving the tower 47 are passed through a conduit 117 which connects with conduit 53, as shown.

It will thus be seen that the condensates from any one or all of the towers 22 to 27 inclusive may be passed to any one or all of the towers 43 to 47 inclusive. When the condensates from the towers 22 to 27 inclusive are passed in the selected manner to the towers 43 to 47 inclusive, they blend with the condensates formed in the towers 43 to 47 inclusive, and are subjected to the action of the heated vapors of the cracking reaction and undergo a heat interchange therewith with the consequent vaporization of the condensates which are vaporizable by such heat interchange. The blending of the condensates of the vapors of distillation and the condensates of the cracking reaction gives a resultant product which is saturated and has the qualities necessary to meet market specifications without further treatment.

By passing the condensates from the towers 45 to 47 inclusive through conduits 112, 114 and 116, they may be caused to flow into conduit 108, where they may join the condensates from tower 44.

The condensates from tower 43 may be passed into conduit 108 through valve controlled conduit 109. Thus, any or all of the condensates from the towers 43 to 47 inclusive may be passed to conduit 91, by which they flow to the accumulator 19, and there they mix with the "reduced crude" from the evaporator 16 and are thereafter subjected to a cracking reaction therewith.

By opening a valve controlled conduit 110 and closing the valve between conduits 91 and 109, the condensates from the tower 43 may be caused to join the condensates from tower 44 flowing through conduit 103 to receiving tank 107. By opening the valve controlled conduit 111 and closing the valve controlled conduit 112, the condensates from the tower 45 may be caused to join the condensates flowing through conduit 64 from the tower 24. By opening the valve controlled conduit 113 and closing the valve controlled conduit 114, the condensates from the tower 46 may be caused to join the condensates flowing through the conduit 62 from the tower 26. By opening the valve controlled conduit 115 and closing the valve controlled conduit 116, the condensates from the tower 47 may be caused to join the condensates flowing through conduit 61 from the tower 27.

With the construction set forth, the following results may be obtained when desired:

Any or all of the condensates from the towers 22 to 27 inclusive may be passed to any or all of the towers 43 to 47 inclusive.

Any or all of the condensates from the towers 22 to 27 inclusive may be passed to the accumulator 19.

Any or all of the condensates from towers 43 to 47 inclusive, may be passed to the accumulator 19.

These condensates may be those generated in the towers 43 to 47 inclusive, from the vapors of the cracking reaction, or a blend of the condensates from the vapors of the cracking reaction and unvaporized condensates passed to the towers 43 to 47 inclusive from the towers 22 to 27 inclusive.

Condensates from the towers 22 and 23, 43 and 44 may be passed direct to independent storage.

Condensates from tower 45 may be blended with the condensates from tower 24 and passed to storage.

Condensates from tower 46 may be blended with the condensates from tower 26 and passed to storage.

Condensates from tower 47 may be blended with condensates from tower 27 and passed to storage.

By proper regulation of the various controlling valves, a simultaneous regulated action of all the recited operations may be caused to occur. As in usual practice various blends of the condensates passed to the receiving storage tanks may be made by suitable controllable pipe connections in the tail-house 58. The residual oil and suspended carbon which collects in the base of the evaporator 38 is passed by valve controlled conduit 118 to the tubes of the exchanger 8, from which it is conducted by valve controlled conduit 119 to a cooler 120. The conduit 119 has two controlling valves 121 and 122, as shown. A valve controlled by-pass 123 is provided, by which the residual oil and suspended carbon from the evaporator 38 may be passed around the exchanger 8. The oil and suspended carbon passes from the cooler 120 by way of a valve controlled conduit 124 to a separator 125. A valve controlled conduit 126 connects the conduit 119 with the conduit 2. Conduit 126 is provided with two valves 127 and 128, and valve controlled by-pass 129 connects the conduit 126 with the conduit 124. Conduit 124 is provided with a valve 130. By closing the valves 122, 128 and 130, and opening the valve 127 and by-pass 129, direct connection may be established from the conduit 119 to the separator 125, independent of the cooler 120. Within the separator 125 is a vertical standpipe 131, tapering at its lower end, similarly to the lower end of the separator. Conduit 124 delivers into the standpipe 131. The residual oil and suspended carbon descend to the bottom of the separator through the standpipe 131 from whence they are drawn off through valve controlled conduit 132. The space around standpipe 131 forms a quiet zone, in which oil, which is separated from the suspended carbon, may rise and pass through a valve controlled overflow conduit 133 to a conduit 134, which is connected by valve controlled conduits 135 and 136, with storage tanks 137 and 138, in which the residue oil is held. From the space around standpipe 131, at a point sufficiently high to draw clarified oil, a valve controlled conduit 129 passes to the pump 140. The pump 140 delivers the clarified oil by way of a valve controlled conduit 141 to a plurality of hydraulic jets 142, situated within the bottom of the evaporator 38. These jets are positioned at an angle to deliver the oil passing therethrough at high velocity against the residual oil and suspended carbon delivered from the pans 39 in such a manner that the residual oil with its suspended carbon and the clarified oil delivered from the jets are set in rapid circular motion. This rapid circular motion keeps the carbon in suspension, thus preventing deposition of the same. The temperature of the clarified oil delivered from the jets is much lower than that of the residual oil, and upon contact with the residual oil chills the same. This chilling of the residual oil causes the carbon therein suspended to assume a crystalline or granular form which prevents adherence to its containing walls. The clarified oil, intermixing with the residual oil, dilutes it, thus helping to hold the carbon in suspension. The carbon is carried to the separator 125, from which it passes suspended in the desired amount of oil to a pump 143 through conduits 132 and 144. From the pump 143 a valve controlled conduit 145, provided with branches 146 leads to the burners 147 in the furnaces, as shown. The desired amount of oil for the burners is drawn off, and the remainder is returned through conduit 148 to the separator, as shown. This constant circulation keeps the carbon constantly in suspension in the circuit and permits the mixture of oil and carbon to be freely delivered to the burners without clogging, and in a uniform mixture. At no time is the carbon allowed to completely settle out of the oil in the base of the separator as it is always combined in the base with residual oil from the base of the evaporator which keeps the carbon in suspension in the oil, and the carbon-laden oil in the base is circulated with sufficient rapidity to prevent separation of the carbon therefrom. A gas conduit 149, having valved connections to the lookboxes in the tailhouse 58, leads to the gas burners 150 through branch conduits, as shown. A blowoff conduit 151 leads from the preheating coil 32 through a coil in a cooling box 152, and a conduit 153 to conduit 2 and storage tanks 4. A blowoff conduit 154 leads from topping coil 13 through a coil in cooling box 152, and thence to conduit 153. A blowoff conduit 155 leads from the cracking coil 35 through a coil in the cooling box 152, to the conduit 134 connected to the residual storage tanks 137 and 138. Control valves 156 are located in the conduits 151, 154 and 155. The position of these control valves in an installation is remote from the stills so as to be accessible in case of fire. For cleaning purposes steam inlets 157 are provided.

Figures 1, 2, 3:
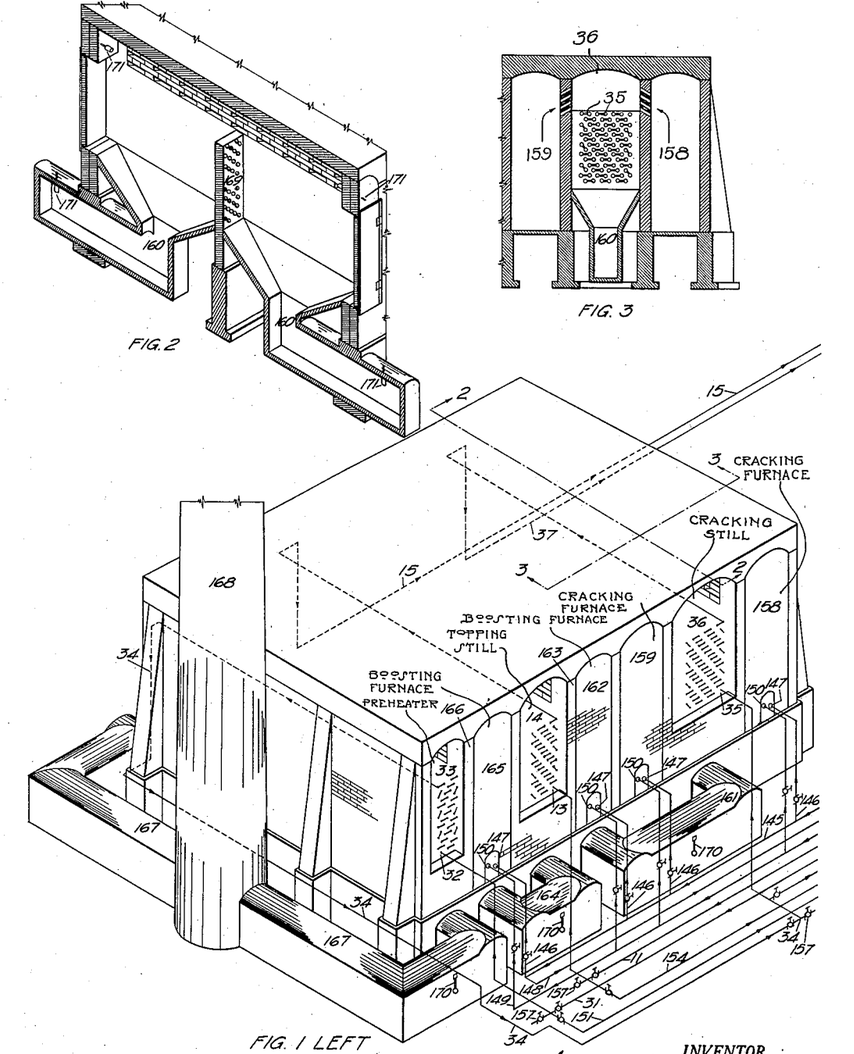
Figure 1 is a plan view of an apparatus for carrying out my process, executed in left and right sections.
Figure 2 is a vertical cross section on line 2—2 on Figure 1.
Figure 3 is a vertical cross section on line 3—3 on Figure 1.
Figures 1, 4:
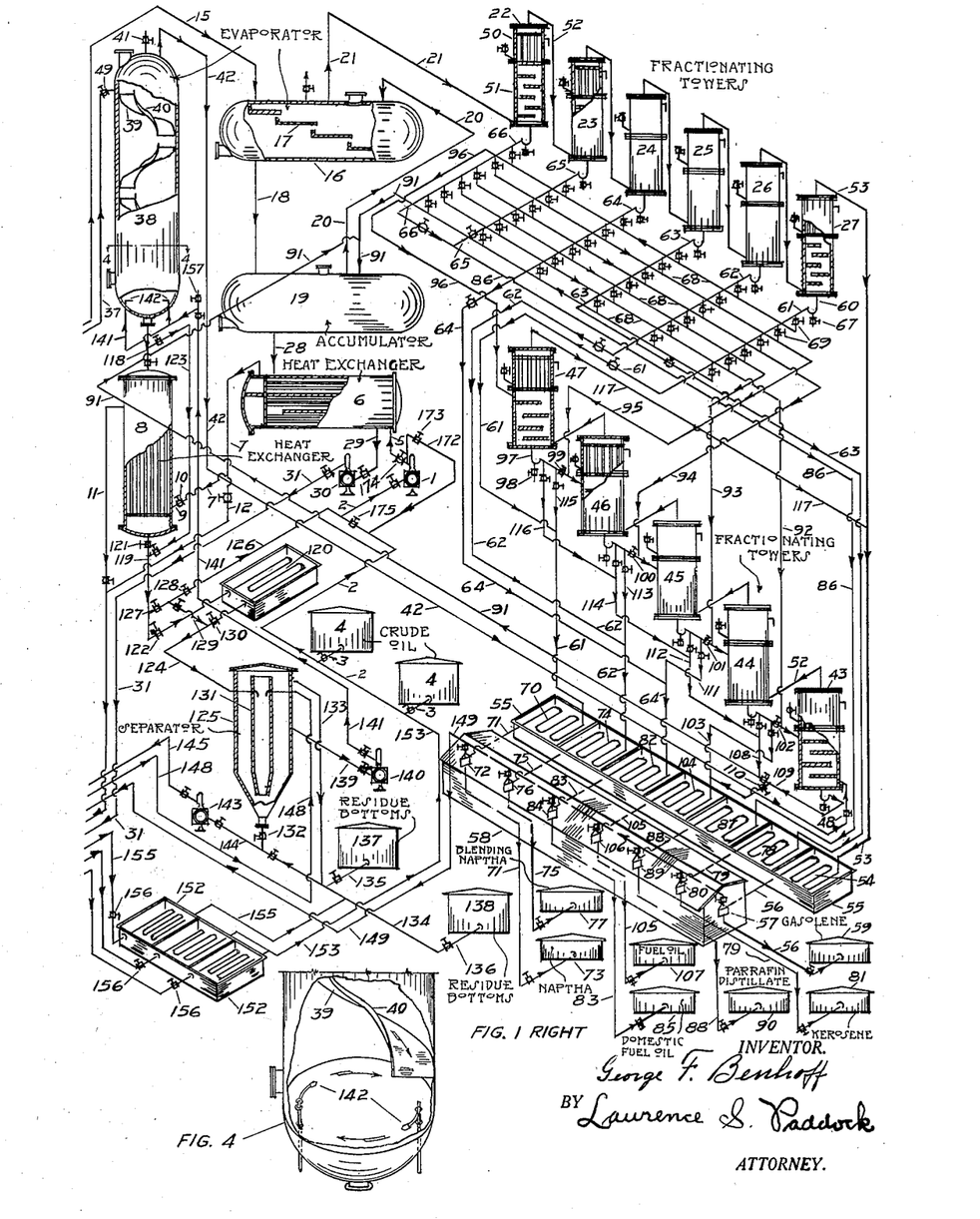
Figure 4 is an enlarged detail view of the lower portion of the evaporator with parts of the wall broken away.
Figure 5:
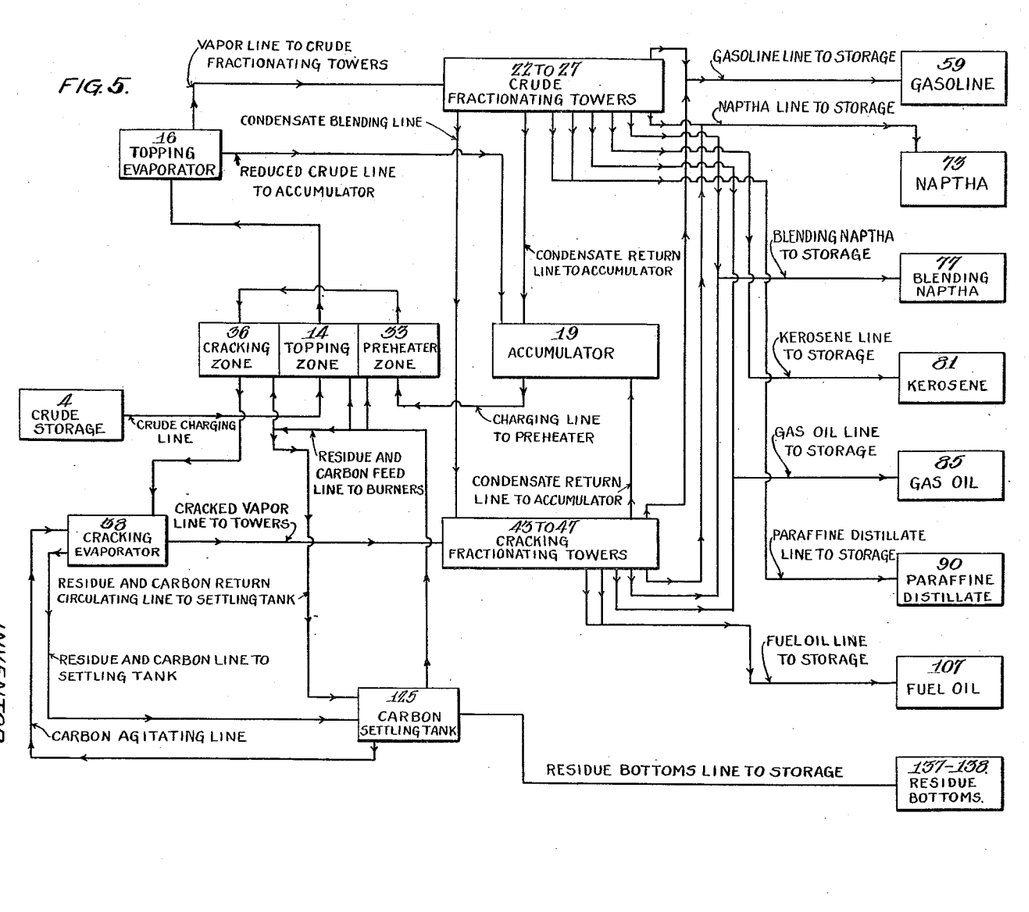
Figure 5 is a flow sheet of the process.

In the embodiment of my invention herein disclosed, there are two furnaces 158 and 159 on either side of the cracking chamber containing the cracking coil 35. The heated gases from the furnaces 158 and 159 are delivered through apertures in the separating walls at the top thereof. These apertures are positioned at an angle so as to cause the streams of heated gases from the furnaces to follow the dome at the top of the cracking chamber and impinge against each other. Thereafter they descend in uniform velocity and volume pass the cracking coil 35 to the central outlet 160. Thence the waste gases pass by a tunnel 161 to a booster furnace 162. The heated gases from the booster furnace pass through apertures in the top of a dividing wall 163 into the top of the chamber containing the topping coil 13. From this topping chamber the waste gases pass out of a central outlet similar to outlet 160, into a tunnel 164. The tunnel 164 delivers the gases to the bottom of a booster furnace 165. The heated gases from the booster furnace 165 are delivered from the top thereof through apertures in the dividing wall 166, into the top of the chamber containing the preheating coil 32. The waste gases pass out through a central outlet similar to outlet 160 in the bottom of the preheating chamber to a tunnel 167, which leads to the stack 168. Duplicate furnaces and chambers are located opposite each other, as shown in Figure 2, and function with those described in a similar manner. These furnaces are separated by dividing wall 169, which acts as a support for the pipes of the coils 13, 32 and 35. In each of the tunnels 161, 164 and 167 are located regulating dampers 170. By means of these dampers the flow of the gases can be controlled so as to assure an even and balanced action throughout. This regulation is particularly efficient in the control of the pairs of furnaces when in simultaneous action. Thermostats 171 are located at points shown to determine the temperature at these points. In the preliminary stage of operation, when testing and filling the system with oil and bringing it up to working temperature, the crude oil is first drawn from the tanks 4 through conduit 2 and branches 3 by pump 1 and circulated through the topping coil 13, conduit 15, evaporator 16, conduit 18 and accumulator 19. From the accumulator 19 the oil passes by conduit 28 to the jacket of the exchanger 6, from which it is drawn through conduit 29 by pump 30 and forced through conduit 31, preheater coil 32, conduit 34, cracking coil 35 and conduit 37, into the evaporator 38. A pressure test may be made of the system between the pump 30 and tower 43 by closing the valve 48 and the valves in conduits 118, 141 and by-pass 123, and filling the system, including the evaporator 38, up to the valve 48 with oil under pressure supplied by the pump 30. A by-pass 172 is provided around pump 1 in which is placed a valve 173. Valves 174 and 175 are also placed in conduits 5 and 2. After the system is filled with oil, as described, and a pressure test made, the valve in the by-pass 123 is opened, also valves 127 and 128, in by-pass 126, while valve 122 and by-pass 129 are closed. Valves 174 and 175 are closed, and valve 173 opened. Pump 1 now draws oil from the evaporator 38 and delivers it into the reservoirs 4 until the desired level is reached in the evaporator 38. At this time the valve 48 is opened which provides a vent so that the oil may be withdrawn from the evaporator 38 freely without the formation of an opposing vacuum. After the desired level is reached, the valve 173 is closed, and the valve 174 opened. The oil is now circulated through the system by pumps 1 and 30 while pump 143 draws oil from the separator 125 and supplies fuel to the burners 147, which are at this time in operation. When the oil in the system is raised to the desired temperature, normal operation follows. Under normal operation valve 175 will be open and valves 127 and 128 closed. At this time crude oil will be drawn from the reservoirs 4. The residual oil and suspended carbon under normal operation will be cooled to the desired temperature by passing it through the cooler 120 before reaching the separator 125.

It will be seen from the above that I have provided a process which performs the conversion of the heavier oils into finished products in a continuous operation and utilizes the heat in a manner that avoids losses inherent in the ordinary processes wherein the products are allowed to cool before final treatment. My process is also capable of evolving the fuel necessary for operation while in action and makes use of the high heat value of the free carbon removed from the conversion cycle which in ordinary processes constitutes an operating loss.

Any desirable mixture of condensates may be retreated, and by the proper return of condensates from the vapors of distillation for blending and treatment with selected condensates of the vaporous products of the cracking reaction, final products are produced which lack the objectionable features of cracked products. My process at the same time utilizes all the advantages obtained by a cracking reaction.

Having described my invention, what I claim is:

1. A process for the conversion of hydrocarbon oils which consists in subjecting heavier hydrocarbon oil to distillation, subjecting the vapors of distillation to fractional condensation, subjecting the residual oil of said distillation to a cracking reaction, subjecting the vaporous products of the cracking reaction to fractional condensation, and subjecting condensates of said distillation to redistillation by intermixture with the vapors and condensates of the vaporous products of the cracking reaction, which are undergoing fractional condensation.

2. A process for the conversion of hydrocarbon oils which consists in subjecting heavy hydrocarbon oil to distillation, subjecting the vapors of distillation to fractional condensation, subjecting the residual oil of said distillation to a cracking reaction, subjecting the vaporous products of said cracking reaction to fractional condensation, subjecting the condensates of said first fractional condensation to redistillation by intermixture with the vapors and condensates of the vaporous products of the cracking reaction while the latter are undergoing fractional condensation, mixing the remaining condensates of said redistillation and fractional condensation of the vaporous products of the cracking reaction with said residual oil of said first distillation and subjecting the mixture thus formed to said cracking reaction.

3. A process for the conversion of hydrocarbon oils which consists in heating heavy hydrocarbon oil to a temperature such as will vaporize a portion thereof permitting said portion to vaporize in an enclosed chamber, removing the unvaporized residual portion of said oil, collecting said removed portion in a separate chamber, subjecting the vapors to fractional condensation, removing the oil in said separate chamber and subjecting it to a cracking temperature under pressure, introducing said oil under cracking temperature into a zone of lower pressure, subjecting the vapors thus formed to fractional condensation, subjecting the unvaporized portion of said oil and free carbon in said zone of lower pressure to a continuous agitating motion and continuously withdrawing said agitated residual oil and free carbon suspended therein.

4. A process for the conversion of hydrocarbon oils which consists in heating heavy hydrocarbon oil to a temperature which will vaporize a portion thereof, permitting said portion to vaporize in an enclosed chamber, removing the unvaporized residual portion of said oil, collecting said removed portion in a separate chamber, subjecting the vapors to fractional condensation, returning a portion of the condensates of said fractional condensation to said separate chamber, removing the mixture of residual oil and condensates thus formed, subjecting said mixture to a cracking temperature under pressure, introducing said mixture under cracking temperature into a zone of lower pressure, and subjecting the vapors thus formed to fractional condensation.

5. A process for the conversion of hydrocarbon oils which consists in heating heavy hydrocarbon oil to a temperature such as will vaporize a portion thereof, permitting said portion to vaporize in an enclosed chamber, removing the unvaporized residual portion of said oil, collecting said removed portion in a separate chamber, subjecting the vapors to fractional condensation, returning a portion of the condensates of said fractional condensation to said separate chamber, removing the mixture of residual oil and condensates thus formed, subjecting said mixture to a cracking temperature under pressure, introducing said mixture under cracking temperature into a zone of lower pressure, subjecting the vapors thus formed to fractional condensation and returning a portion of the condensates thus formed by said last named fractional condensation to said separate chamber wherein they are added to the mixture of residual oil and condensates therein and undergo treatment therewith.

6. A process for the conversion of hydrocarbon oils which consists in heating heavy hydrocarbon oil to a distilling temperature such as will vaporize a portion thereof, permitting said portion to vaporize in an enclosed chamber, removing the unvaporized residual portion of said oil, collecting said removed portion in a separate chamber, subjecting the vapors to fractional condensation, subjecting said unvaporized residual portion to a cracking reaction, subjecting the vapors of the cracking reaction to fractional condensation, mixing condensates of said fractional condensation of the vapors of distillation with condensates and vapors of the cracking reaction while the latter are undergoing fractional condensation, returning the unvaporized condensates of the vapors of distillation and cracking reaction to said separate chamber and subjecting the mixture of oils therein to said cracking reaction.

7. A process for the conversion of hydrocarbon oils which consists in subjecting heavy hydrocarbon oil to distillation, subjecting the vapors of distillation to fractional condensation in a series of zones of decreasing temperature, subjecting the residual oil of said distillation to a cracking reaction, subjecting the vaporous products of said cracking reaction to fractional condensation and subjecting selected condensates from a portion of said zones of decreasing temperature to redistillation by intermixture with the vapors and condensates of the vaporous products of said cracking reaction which are undergoing fractional condensation.

8. A process for the conversion of hydrocarbon oils which consists in subjecting heavy hydrocarbon oil to distillation, subjecting the vapors of distillation to fractional condensation in a series of zones of decreasing temperature, subjecting the residual oil of said distillation to a cracking reaction, subjecting the vaporous products of said cracking reaction to fractional condensation in a series of zones of decreasing temperature and subjecting selected condensates from a portion of said zones wherein the vapors of distillation are being condensed to redistillation by intermixture with the vapors and condensates of selected zones wherein the vaporous products of said cracking reaction are being condensed.

9. A process for the conversion of hydrocarbon oils which consists in subjecting heavy hydrocarbon oil to distillation, subjecting the vapors of said distillation to fractional condensation, subjecting the residual oil of said distillation to a preliminary heating, subjecting said preheated oil to a cracking reaction, subjecting the vaporous products of said cracking reaction to fractional condensation, subjecting selected condensates of said distillation to redistillation by intermixture with the vaporous products of said cracking reaction while the latter are undergoing fractional condensation, and mixing the remaining condensates with the residual oil from said fractional distillation so as to undergo a cracking reaction therewith.

10. In a process for the conversion of hydrocarbon oils the steps of subjecting heavy hydrocarbon oil to a cracking temperature, subsequently introducing said heated oil into a zone of lower pressure and removing the vapors formed in said zone and constantly agitating the residual unvaporized oil and suspended carbon released in said zone by injecting thereinto a separate stream of oil consisting of residual oil which has been previously withdrawn from said zone and clarified and removing the mixture thus formed of residual unvaporized oil, suspended carbon and clarified residual oil.

11. In a process of conversion of hydrocarbon oils the steps of heating said oil to a cracking temperature, introducing the said heated oil into a zone of lower pressure so as to release the constituents thereof in the vapor form which are vaporizable at the temperature to which they have been heated and at the pressure within the zone of expansion, and constantly agitating the residual unvaporized oil and suspended carbon released in said zone by injecting thereinto a separate stream of oil consisting of residual oil which has been previously withdrawn from said zone and clarified, and removing the mixture thus formed of residual unvaporized oil, suspended carbon and clarified residual oil.

12. In a process for the conversion of hydrocarbon oil the steps of heating said oil to a cracking temperature, introducing said heated oil into a zone of lower pressure so as to release the constituents thereof in vapor form which are vaporizable at the temperature to which they have been heated and at the pressure within the zone of expansion and continuously agitating the residual unvaporized oil and suspended carbon in said zone by injecting thereinto a separate stream of oil, consisting of residual oil which has been previously withdrawn from said zone and clarified, and withdrawing the mixture of residual unvaporized oil, suspended carbon and clarified residual oil thus formed and burning said mixture so as to produce said heating.

13. In a process for the conversion of hydrocarbon oil, the steps of heating said oil to a cracking temperature, introducing said heated oil into a zone of lower pressure so as to release the constituents thereof in the vapor form which are vaporizable at the temperature to which they have been heated and at the pressure within the zone of expansion continuously agitating the residual unvaporized oil and suspended carbon in said zone by injecting thereinto a separate stream of oil consisting of residual oil which has been previously withdrawn from said zone and clarified, settling the suspended carbon out of the portion of the mixture of residual unvaporized oil, suspended carbon and clarified residual oil thus formed and burning the portion of said mixture containing the carbon so as to produce said heating.

14. In a process for the conversion of hydrocarbon oil the steps of heating said oil to a cracking temperature, introducing said heated oil into a zone of lower pressure so as to release the constituents thereof in the vapor form which are vaporizable at the temperature to which they have been heated and at the pressure within the zone of expansion, subjecting the residual unvaporized oil and suspended carbon to continuous agitation by imparting thereto a rapid circular motion by the injection thereinto of a separate stream of hydrocarbon oil consisting of residual oil which has been previously withdrawn from said zone and clarified and continuously 15. In a process for the conversion of hydrocarbon oil the steps of heating said oil to a cracking temperature, introducing said heated oil into a zone of lower pressure so as to release the constituents thereof in the vapor form which are vaporizable at the temperature to which they have been heated and at the pressure within the zone of expansion, continuously agitating the residual unvaporized oil and suspended carbon in said zone by injecting thereinto a separate stream of oil consisting of residual oil which has been previously withdrawn from said zone and clarified, withdrawing the mixture of residual unvaporized oil, suspended carbon and clarified residual oil thus formed, cooling said mixture and burning the same so as to produce said heating.

16. In a process for the conversion of hydrocarbon oil the steps of heating said oil to a cracking temperature, introducing said heated oil into a zone of lower pressure so as to release the constituents thereof in the vapor form which are vaporizable at the temperature to which they have been heated and at the pressure within the zone of expansion, continuously agitating and withdrawing the residual unvaporized oil and suspended carbon, clarifying a portion of said residual oil by settling out the suspended carbon therein, circulating the unclarified oil and suspended carbon, withdrawing and burning a portion of said circulating oil and suspended carbon and returning the circulating unburned oil and suspended carbon to said residual unvaporized oil and suspended carbon withdrawn from the zone of expansion.

17. In a process for the conversion of hydrocarbon oil the steps of heating said oil to a cracking temperature, introducing said heated oil into a zone of lower pressure so as to release the constituents thereof in the vapor form which are vaporizable at the temperature to which they have been heated and at the pressure within the zone of expansion, continuously withdrawing the residual unvaporized oil and suspended carbon, clarifying a portion of said residual oil by settling out the suspended carbon therein and delivering said clarified oil into said residual unvaporized oil and suspended carbon while in said zone of expansion, in such a manner as to impart rapid motion thereto together with said clarified oil.

18. In a process for the conversion of hydrocarbon oil the steps of heating said oil to a cracking temperature, introducing said heated oil into a zone of lower pressure so as to release the constituents thereof in the vapor form which are vaporizable at the temperature to which they have been heated and at the pressure within the zone of expansion, continuously withdrawing the residual unvaporized oil and suspended carbon, cooling the unvaporized oil and suspended carbon, thus withdrawn, clarifying a portion of said residual oil by settling out the suspended carbon therein and delivering said clarified oil into said residual unvaporized oil and suspended carbon while in said zone of expansion, in such a manner as to cause rapid motion thereof and a rapid fall in temperature.

19. In a process for the conversion of hydrocarbon oil the steps of heating said oil to a cracking temperature, introducing said heated oil into a zone of lower pressure so as to release the constituents thereof in vapor form which are vaporizable at the temperature to which they have been heated and at the pressure within the zone of expansion, continuously withdrawing the residual unvaporized oil and suspended carbon, clarifying a portion of said residual oil by settling out the suspended carbon therein and delivering said clarified oil in jets of high velocity into said residual unvaporized oil while in the zone of expansion in such a manner as to cause said residual oil and suspended carbon to be set in rapid motion together with said clarified oil.

20. In a process for the conversion of hydrocarbon oil the steps of heating said oil to a cracking temperature, introducing said heated oil into a zone of lower pressure so as to release the constituents thereof in vapor form which are vaporizable at the temperature to which they have been heated and at the pressure within the zone of expansion, causing the heated oil to follow a helical path in cascade fashion in a downward direction whereby its vaporization and motion is rapidly augmented, continuously withdrawing the residual unvaporized oil and suspended carbon, clarifying a portion of said residual oil by settling out the suspended carbon therein and delivering said clarified oil into said residual oil and suspended carbon while in the zone of expansion in such a manner as to cause rapid circular motion thereof.

In testimony whereof, I have signed my name to this specification this twenty-ninth day of March, 1924.

GEORGE F. BENHOFF.